United States Patent
Day et al.

(10) Patent No.: US 12,145,730 B2
(45) Date of Patent: Nov. 19, 2024

(54) VEHICULAR SEAT ASSEMBLY HAVING EXPANDABLE SEAT BACK SECTION

(71) Applicant: AMI Industries, Inc., Colorado Springs, CO (US)

(72) Inventors: Martin Shawn Day, Colorado Springs, CO (US); Douglas Alexander Foisie, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 211 days.

(21) Appl. No.: 17/966,595

(22) Filed: Oct. 14, 2022

(65) Prior Publication Data

US 2024/0124143 A1  Apr. 18, 2024

(51) Int. Cl.
  *B64D 11/06* (2006.01)
(52) U.S. Cl.
  CPC ........ *B64D 11/0647* (2014.12); *B64D 11/064* (2014.12)
(58) Field of Classification Search
  CPC .... B64D 11/0647; B64D 11/06; B64D 11/064
  USPC .......................................................... 297/14
  See application file for complete search history.

(56) References Cited

U.S. PATENT DOCUMENTS

| | | | |
|---|---|---|---|
| 1,698,036 A | 1/1929 | Trammell | |
| 2,556,076 A | 6/1951 | Evans et al. | |
| 3,314,720 A | 4/1967 | Ralph et al. | |
| 3,700,278 A * | 10/1972 | Gulba | A45F 3/26 182/187 |
| 6,446,910 B1 | 9/2002 | Knoll et al. | |
| 7,874,619 B2 | 1/2011 | Harley | |
| 11,472,559 B1 * | 10/2022 | Pacheco | B64D 11/0647 |
| 2006/0071510 A1 | 4/2006 | Jiang et al. | |
| 2007/0052272 A1 | 3/2007 | Fabel | |
| 2018/0155035 A1 * | 6/2018 | Spagl | B64D 11/064 |
| 2019/0161194 A1 * | 5/2019 | Pacheco | B64D 11/0691 |

FOREIGN PATENT DOCUMENTS

| | | |
|---|---|---|
| WO | 2015155688 A1 | 10/2015 |
| WO | 2016030843 A1 | 3/2016 |

OTHER PUBLICATIONS

European Search Report dated Feb. 27, 2024; European Application No. 23202823.3.

* cited by examiner

*Primary Examiner* — Anthony D Barfield
(74) *Attorney, Agent, or Firm* — Suiter Swantz IP

(57) ABSTRACT

A system may include a vehicular seat assembly including first and second seat support beams, a seat pan, a bar, a fabric seat back, and at least one detachable attachment means. The fabric seat back may have a first end and a second end. The fabric seat back may be secured at the first end to the bar. The fabric seat back may have an expandable seat back section secured at the second end to the seat pan. Each detachable attachment means may be secured at a first detachable attachment means end to the seat pan and may be secured at a second detachable attachment means end to a portion of the fabric seat back located between the first end and the second detachable attachment means end. When all detachable attachment means are in the detached state, an effective length of the fabric seat back may extend.

19 Claims, 16 Drawing Sheets

VEHICULAR SEAT ASSEMBLY HAVING EXPANDABLE SEAT BACK SECTION

BACKGROUND

Currently, rotorcraft troops are often required to wear an equipment pack while seated. Conventional troop seating covers include a one-piece fabric cover with a straight back positioned at an angle to the seat bottom, which can cause an occupant to be pushed forward away from full contact with the seat back when the occupant is wearing an equipment pack. This reduction in body support can degrade comfort and safety for the occupant.

SUMMARY

In one aspect, embodiments of the inventive concepts disclosed herein are directed to a system. The system may include a vehicular seat assembly. The vehicular seat assembly may include a first seat support beam, a second seat support beam, a fold-out seat pan, a bar, a fabric seat back, and at least one detachable attachment means. The fold-out seat pan may be configured to fold out to a seat pan deployed state. The fold-out seat pan may be rotatably coupled to first seat support beam and the second seat support beam. The bar may be positioned between the first seat support beam and the second seat support beam. The fabric seat back may have a first end and a second end. The fabric seat back may be secured at the first end to the bar. The fabric seat back may extend from the first end toward the second end. The fabric seat back may have an expandable seat back section. The expandable seat back section may be secured at the second end to the fold-out seat pan. Each of the at least one detachable attachment means may be secured at a first detachable attachment means end to the fold-out seat pan. Each of the at least one detachable attachment means may be secured at a second detachable attachment means end to a portion of the fabric seat back located between the first end and the second detachable attachment means end. The expandable seat back section may extend from the second end at least to the second releasable attachment means end. Each of the at least one detachable attachment means may be configured to be in an attached state or a detached state. When all of the detachable attachment means are in the detached state an effective length of the fabric seat back may extend to include the expandable seat back section.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
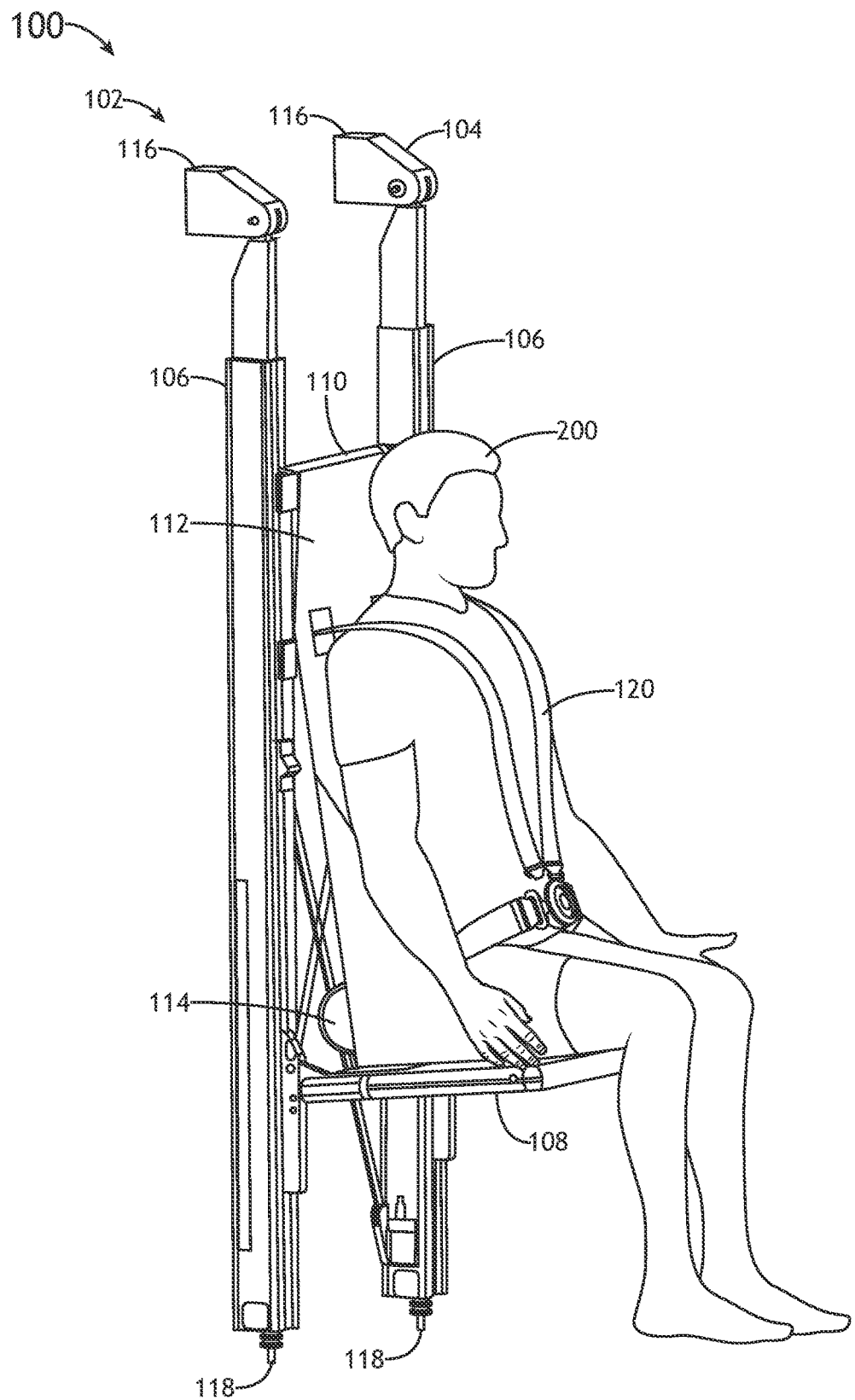
FIG. 1 is a view of an exemplary embodiment of a system including a vehicle including at least one seat assembly according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system including a seat assembly. In some embodiments, the seat assembly may include: a fabric seat back having an expandable seat back section; and at least one detachable attachment means configured to be in an attached state or a detached state, wherein when all of the at least one detachable attachment means are in the detached state, an effective length of the fabric seat back extends to include the expandable seat back section.

Some embodiments may include a fabric seat back having a two-state configuration that can be quickly and easily switched to an attached state (e.g., a no-pack state) and a detached state (e.g., a pack-equipped state), which may carry occupant loading during flight and crash situations. Some embodiments may improve occupant comfort and safety by allowing both an unequipped or a pack-equipped occupant to nest fully back into the fabric seat back for comfort and effective load transfer.

Figure 2:
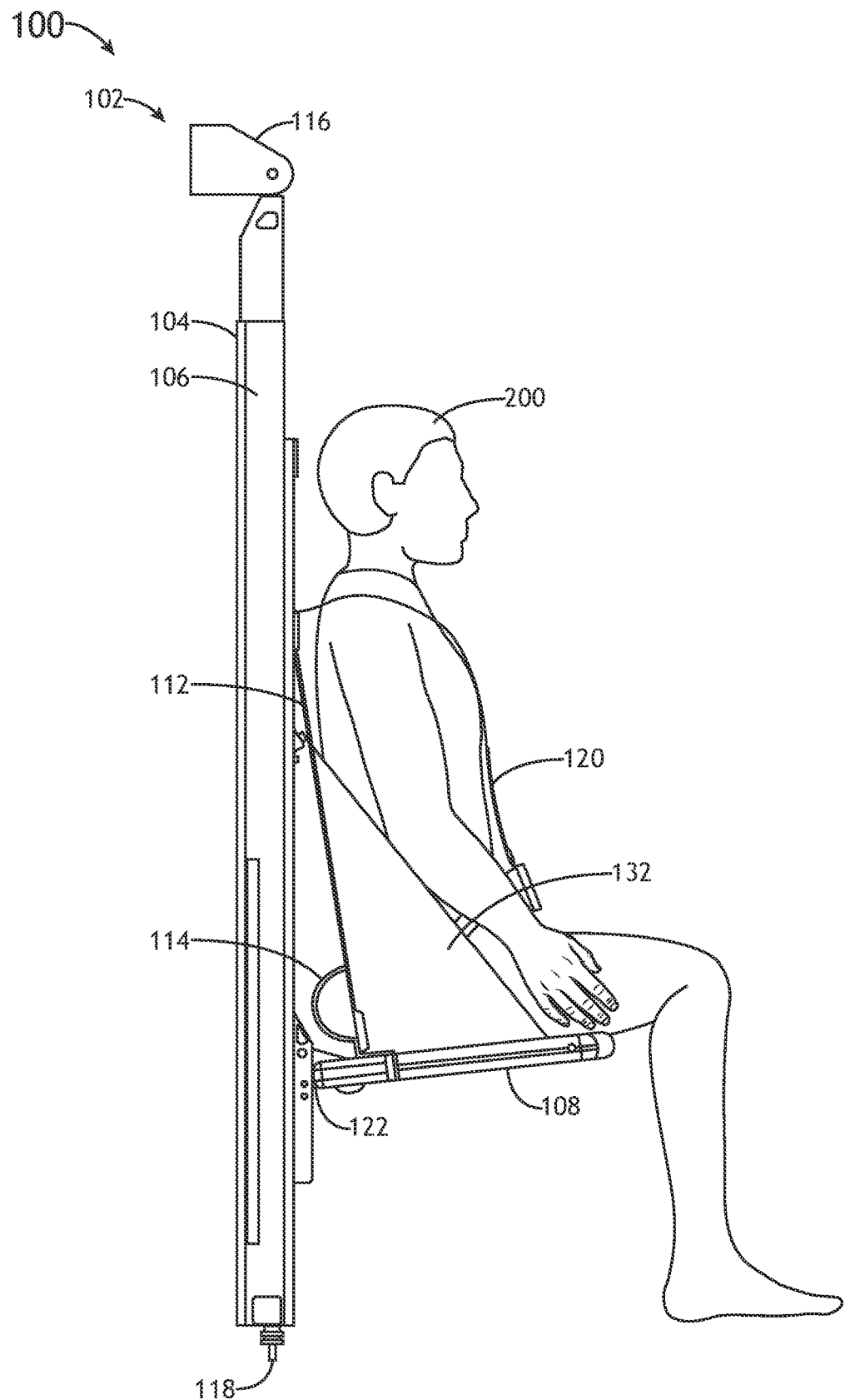
FIG. 2 is a view of the seat assembly of FIG. 1 according to the inventive concepts disclosed herein.
Figure 3:
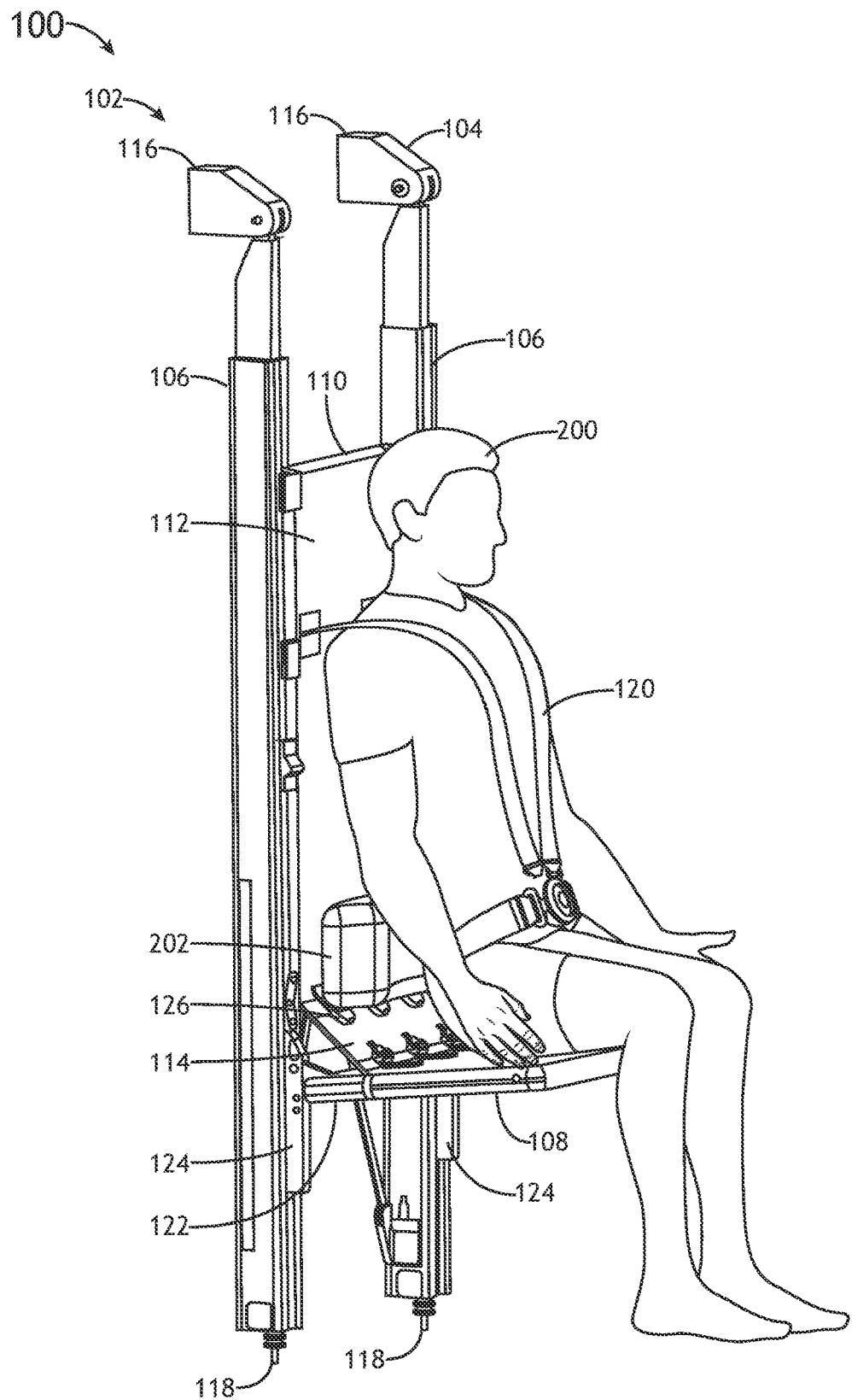
FIG. 3 is a view of the seat assembly of FIG. 1 according to the inventive concepts disclosed herein.
Figure 4:
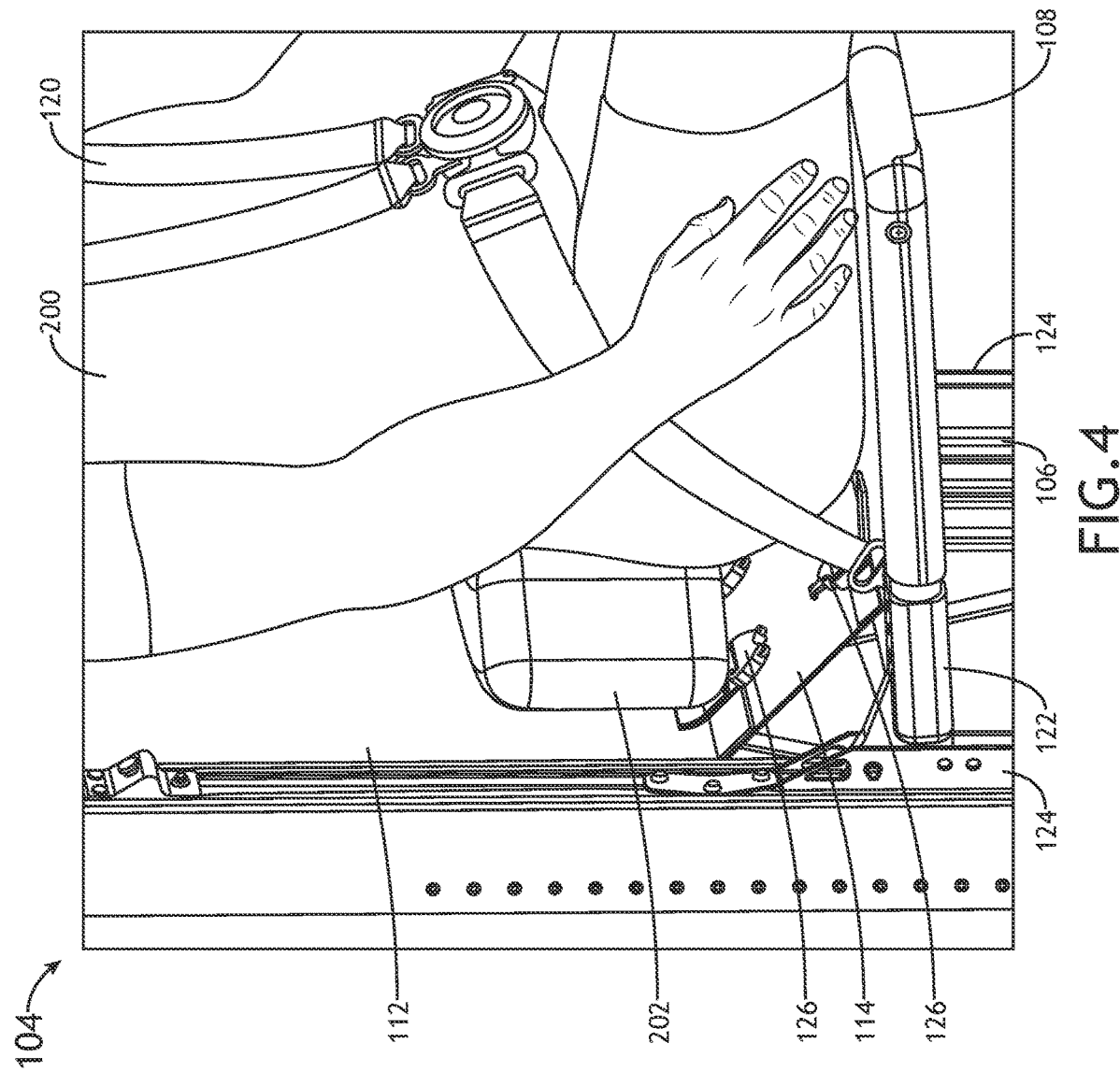
FIG. 4 is a view of a portion of the seat assembly of FIG. 1 according to the inventive concepts disclosed herein.
Figure 5:
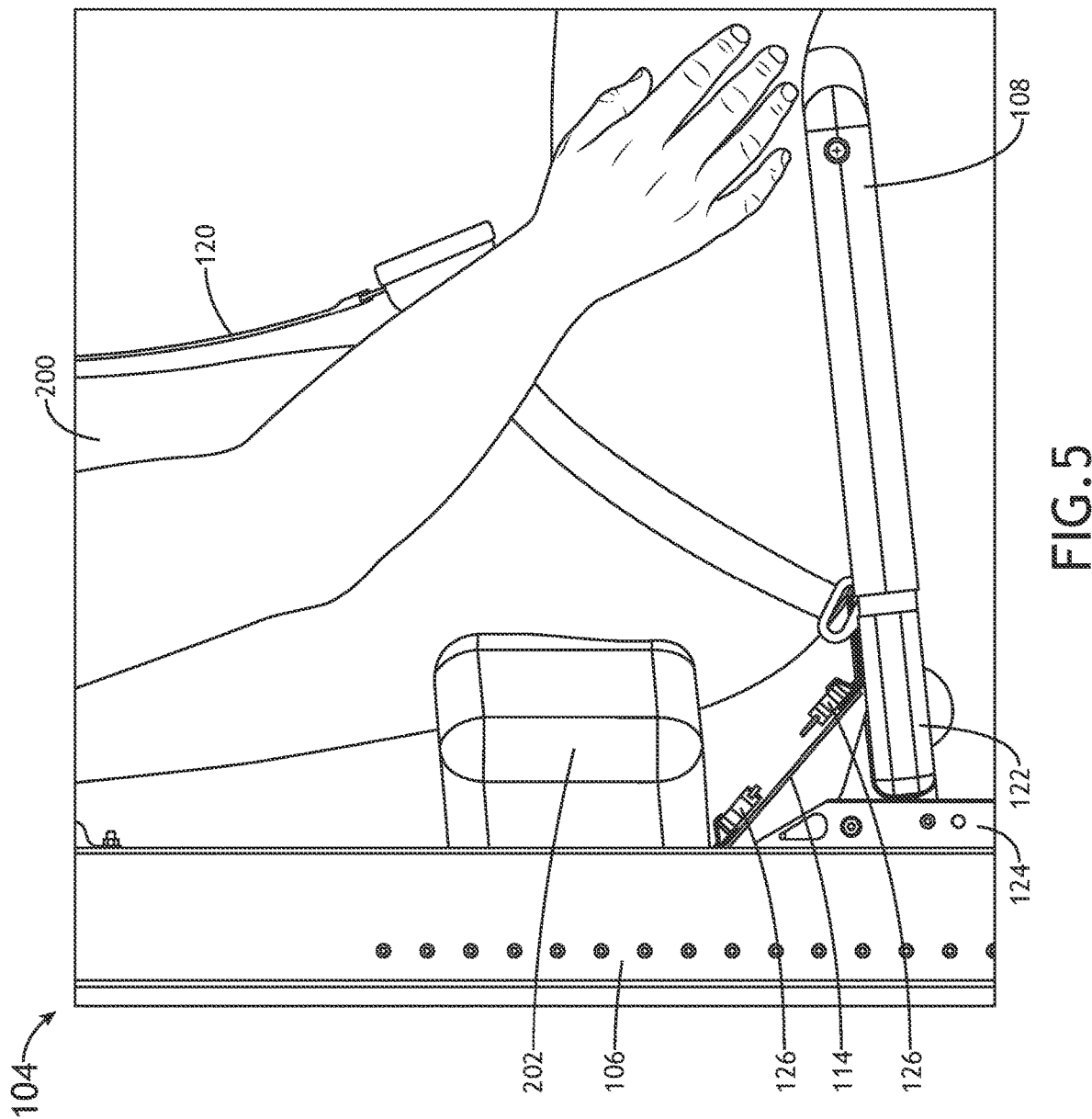
FIG. 5 is a view of a portion of the seat assembly of FIG. 1 according to the inventive concepts disclosed herein.

Referring now to FIGS. 1-2, an exemplary embodiment of a system 100 including a vehicle (e.g., aircraft (e.g., rotorcraft 102), watercraft, automobile, train, etc.) including at least one seat assembly (e.g., a vehicular seat assembly (e.g., an aircraft seat assembly (e.g., a rotorcraft seat assembly 104))) is depicted according to the inventive concepts. FIGS. 1-2 show an occupant 200 seated without a pack (e.g., 202, such as shown in FIGS. 3-5). As shown in FIGS. 1-2, one, some, or all of the at least one detachable attachment means (e.g., 126, such as shown in FIGS. 3-8) may be in an attached state.

For example, each seat assembly may have at least one seat support beam 106 (e.g., two seat support beams 106 as shown), at least one fold-out seat pan 108, a bar 110, a fabric seat back 112, an expandable seat back section 114, at least one top attachment structure 116 (e.g., at least one top attachment bracket), at least one bottom attachment structure 118 (e.g., at least one bottom attachment pin), a harness 120, at least one hinge 122, at least one hinge bracket 124, and/or at least one fabric seat side 132, some or all of which may be coupled to another at any given time.

In some embodiments, the seat assembly (e.g., a vehicular seat assembly (e.g., an aircraft seat assembly (e.g., a rotorcraft seat assembly 104))) may be installed within the vehicle (e.g., aircraft (e.g., rotorcraft 102), watercraft, automobile, train, etc.), such as via the at least one top attachment structure 116 (e.g., the at least one top attachment bracket) and the at least one bottom attachment structure 118 (e.g., the at least one bottom attachment pin) being attached to interior attachment points of the vehicle.

Referring now to FIGS. 3-5, an exemplary embodiment of the system 100 of FIGS. 1-2 is depicted according to the inventive concepts. FIGS. 3-5 show an occupant 200 seated with a pack 202. As shown in FIGS. 3-5, all of the at least one detachable attachment means 126 may be in a detached state.

In some embodiments, the second seat support beam 106 may be parallel to the first seat support beam. For example, the first seat support beam 106 may be a first vertical seat support beam, and the second seat support beam 106 may be a second vertical seat support beam. In some embodiments, each of the first and second seat support beam 106 may be telescoping beams.

The fold-out seat pan 108 may be configured to fold out to a seat pan deployed state (as shown). The fold-out seat pan may be rotatably coupled to first seat support beam 106 and the second seat support beam 106 via the hinges 122 and corresponding hinge brackets 124 such that the fold-out seat can move from the deployed state to a folded up stowed state (not shown). In some embodiments, the fold-out seat pan 108 may be composed at least of nylon (e.g., military grade nylon).

The bar 110 may be positioned between the first seat support beam 106 and the second seat support beam 106. In some embodiments, the bar 110 may be a horizontal bar. In some embodiments, the bar 110 may be coupled to the first seat support beam 106 and to the second seat support beam 106.

The fabric seat back 112 may have a first end and a second end, the fabric seat back 112 secured (e.g., wrapped around and sewn, or attached via rings) at the first end to the bar 110. The fabric seat back 112 may extend from the first end toward the second end. The fabric seat back 112 may have an expandable seat back section 114. The expandable seat back section may be secured at the second end to the fold-out seat pan 108. In some embodiments, the fabric seat back 112 may be composed at least of nylon (e.g., military grade nylon).

Each of the at least one detachable attachment means 126 may be secured at a first detachable attachment means end 126 to the fold-out seat pan 108. Each of the at least one detachable attachment means 126 secured at a second detachable attachment means end to a portion of the fabric seat back 112 located between the first end and the second detachable attachment means end.

Figure 15:
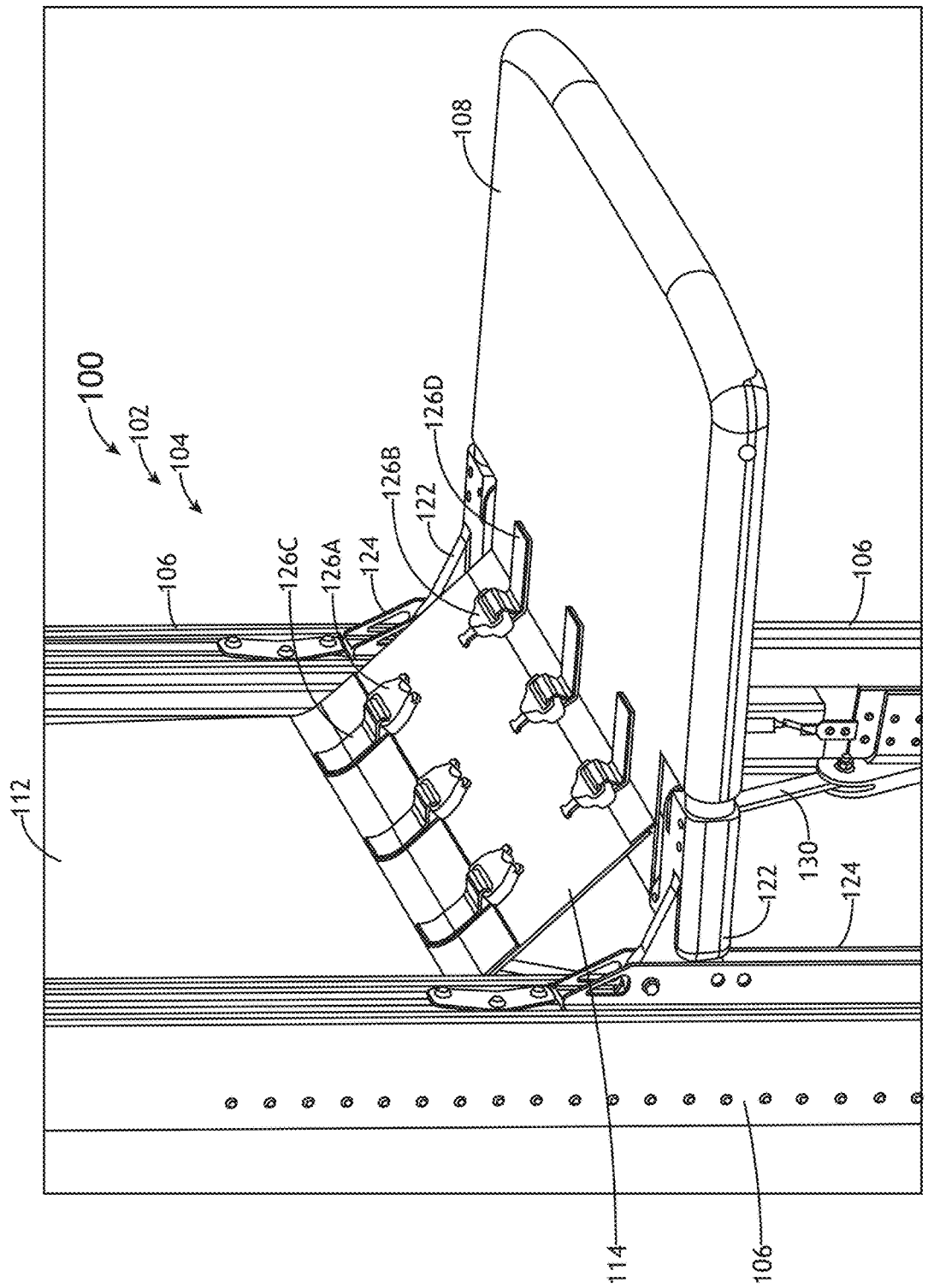
FIG. 15 is a view of a portion of the seat assembly of FIG. 1 according to the inventive concepts disclosed herein.
Figure 16:
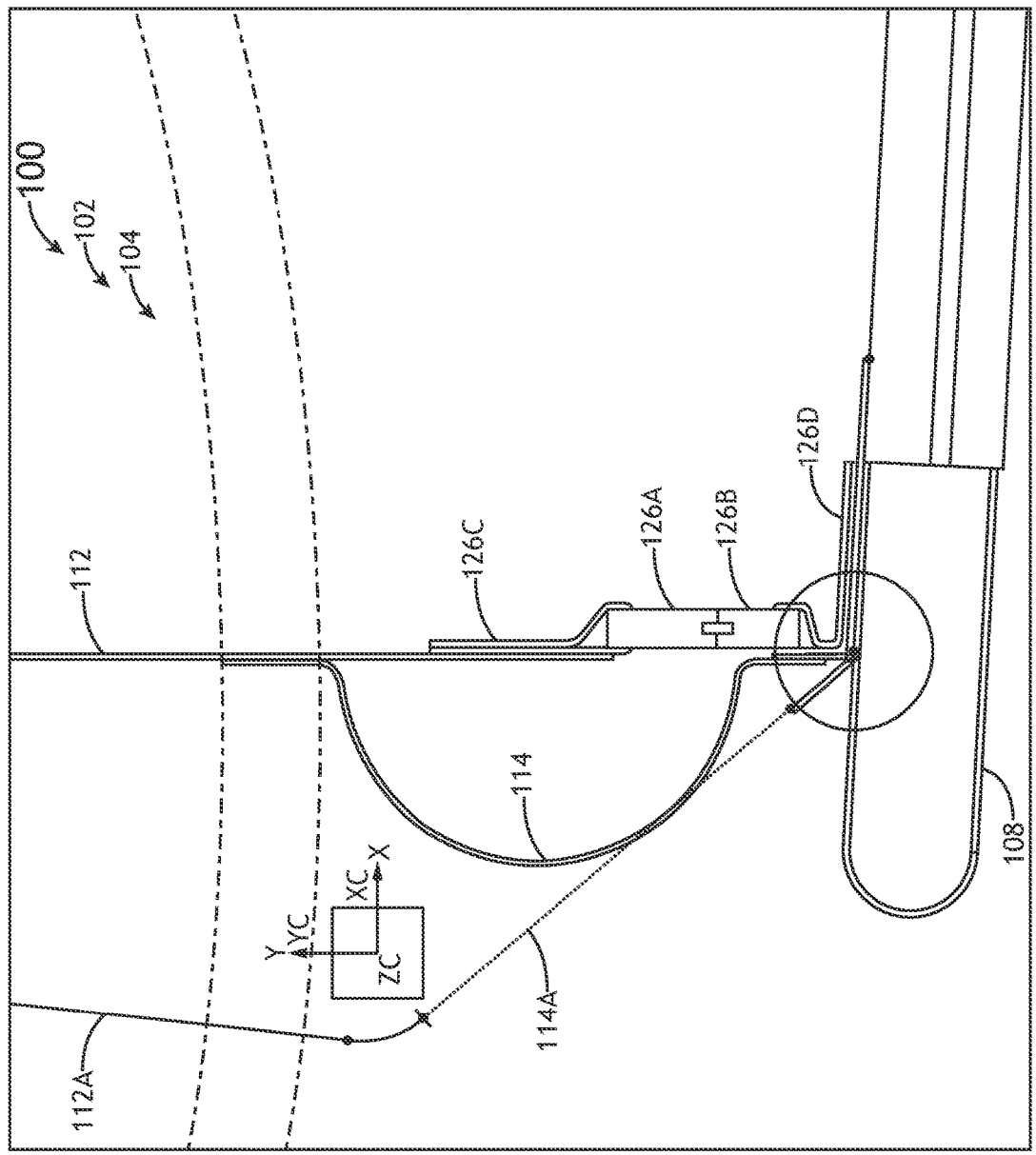
FIG. 16 is a view of a portion of the seat assembly of FIG. 1 according to the inventive concepts disclosed herein.

The expandable seat back section 114 may extend from the second end at least to the second detachable attachment means end (e.g., of the strap 126C, as shown in FIGS. 15-16). In some embodiments, the expandable seat back section 114 may have a length of five to ten inches. In some embodiments, the expandable seat back section 114 may extend from the second end past the second detachable attachment means end (e.g., of the strap 126C, as shown in FIGS. 15-16).

Each of the at least one detachable attachment means 126 may be configured to be in an attached state or a detached state. When all of the detachable attachment means 126 are in the detached state, an effective length (e.g., a usable length (e.g., by the occupant 200) of the fabric seat back 112) of the fabric seat back 112 may extend to include the expandable seat back section 114. For example, an occupant 200 wearing a pack 202 may sit in the seat assembly such that the pack 202 may be positioned against the fabric seat back 112 while the fold-out seat pan 108 and the fabric seat back 112 support (e.g., fully, safely, and/or comfortably support) the occupant 200 wearing the pack 202.

Figure 6:
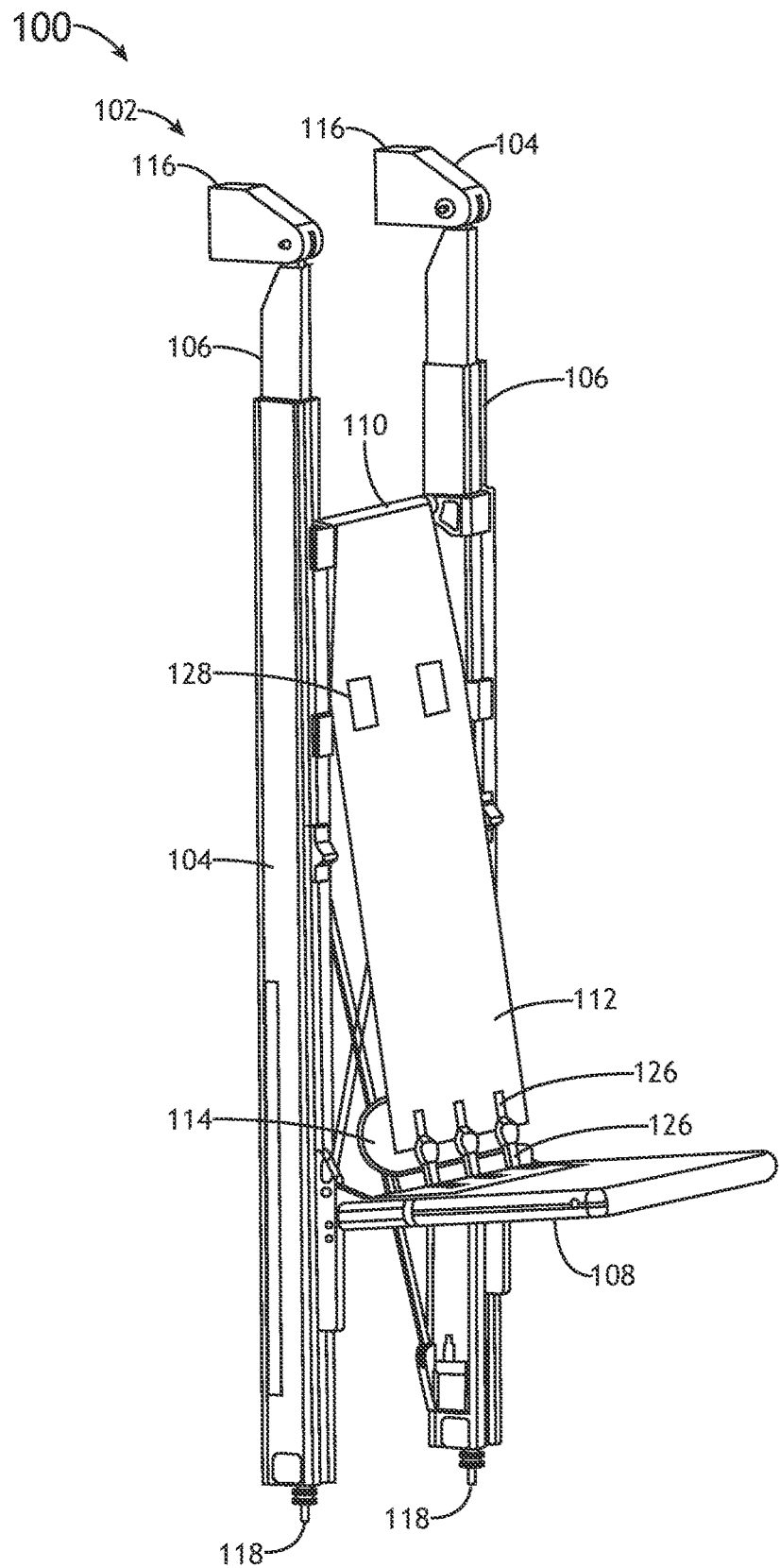
FIG. 6 is a view of the seat assembly of FIG. 1 according to the inventive concepts disclosed herein.
Figure 7:
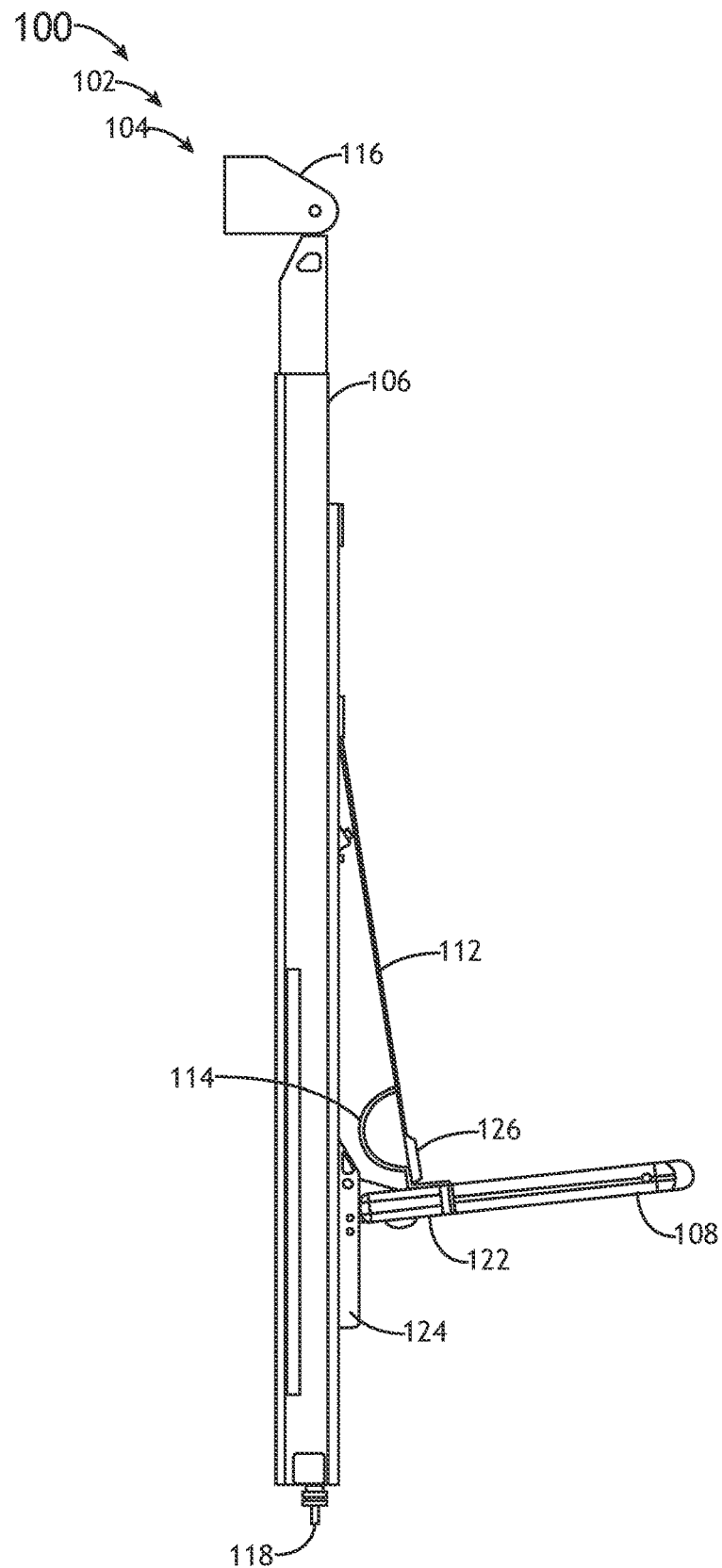
FIG. 7 is a view of the seat assembly of FIG. 1 according to the inventive concepts disclosed herein.
Figure 8:
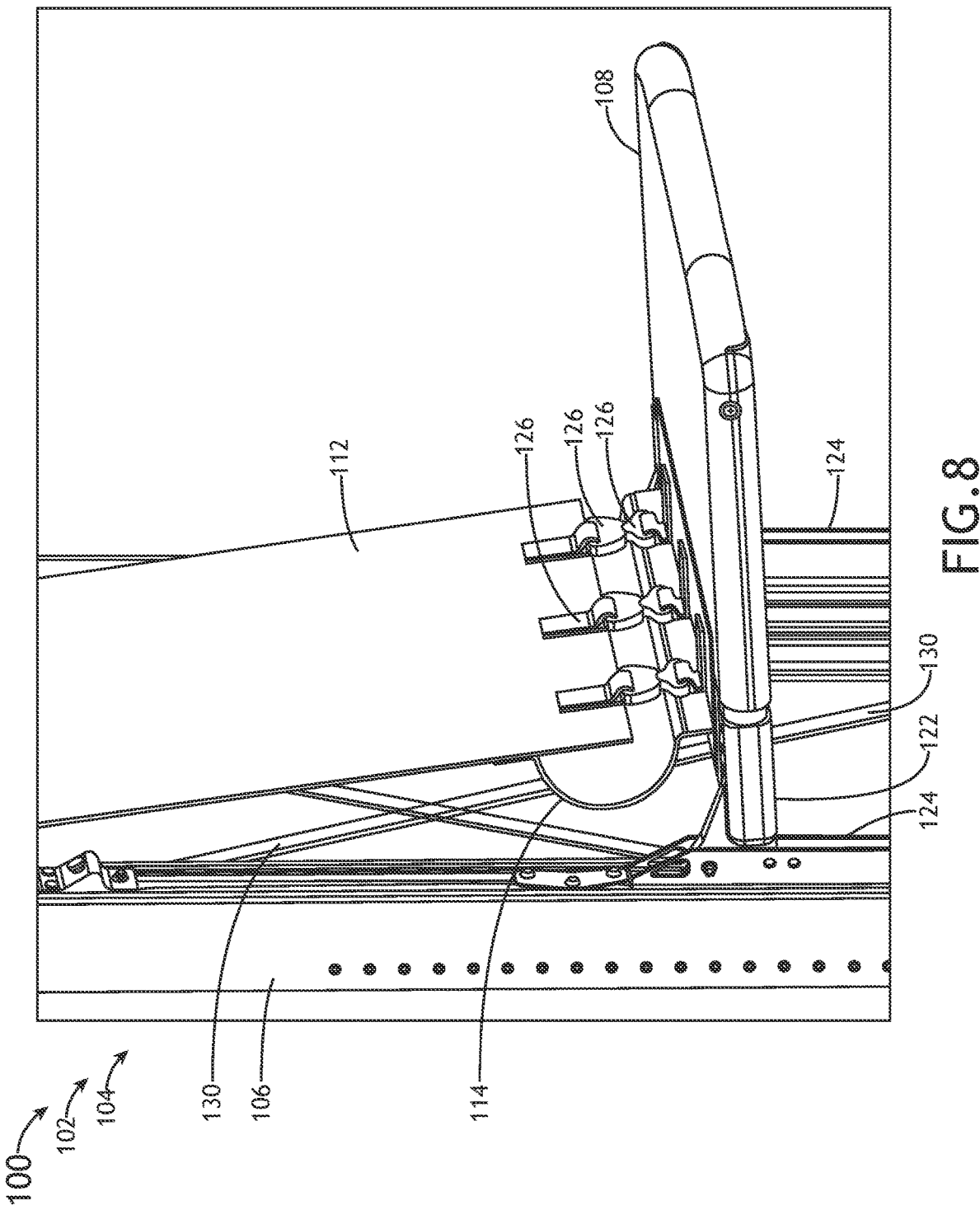
FIG. 8 is a view of a portion of the seat assembly of FIG. 1 according to the inventive concepts disclosed herein.

Referring now to FIGS. 6-8, an exemplary embodiment of the system 100 of FIGS. 1-5 is depicted according to the inventive concepts. As shown in FIGS. 6-8, all of the at least one detachable attachment means 126 may be in an attached state.

For example, as shown in FIG. 6, the fabric seat back 112 may include one or more harness apertures 128 configured to accommodate the harness 120 passing through the fabric seat back 112.

For example, as shown in FIG. 6, the seat assembly may include angled support rods 130. Each of the angled support rods 130 may be coupled to the first seat support beam 106 and the second seat support beam 106. The angled support rods 130 may act as truss supports between the first seat support beam 106 and the second seat support beam 106.

Referring now to FIGS. 9-12, an exemplary embodiment of the system 100 of FIGS. 1-8 is depicted according to the inventive concepts. FIGS. 9-12 show a pack 202 positioned against the fabric seat back 112. As shown in FIGS. 9-12, all of the at least one detachable attachment means 126 may be in a detached state.

Figure 9:
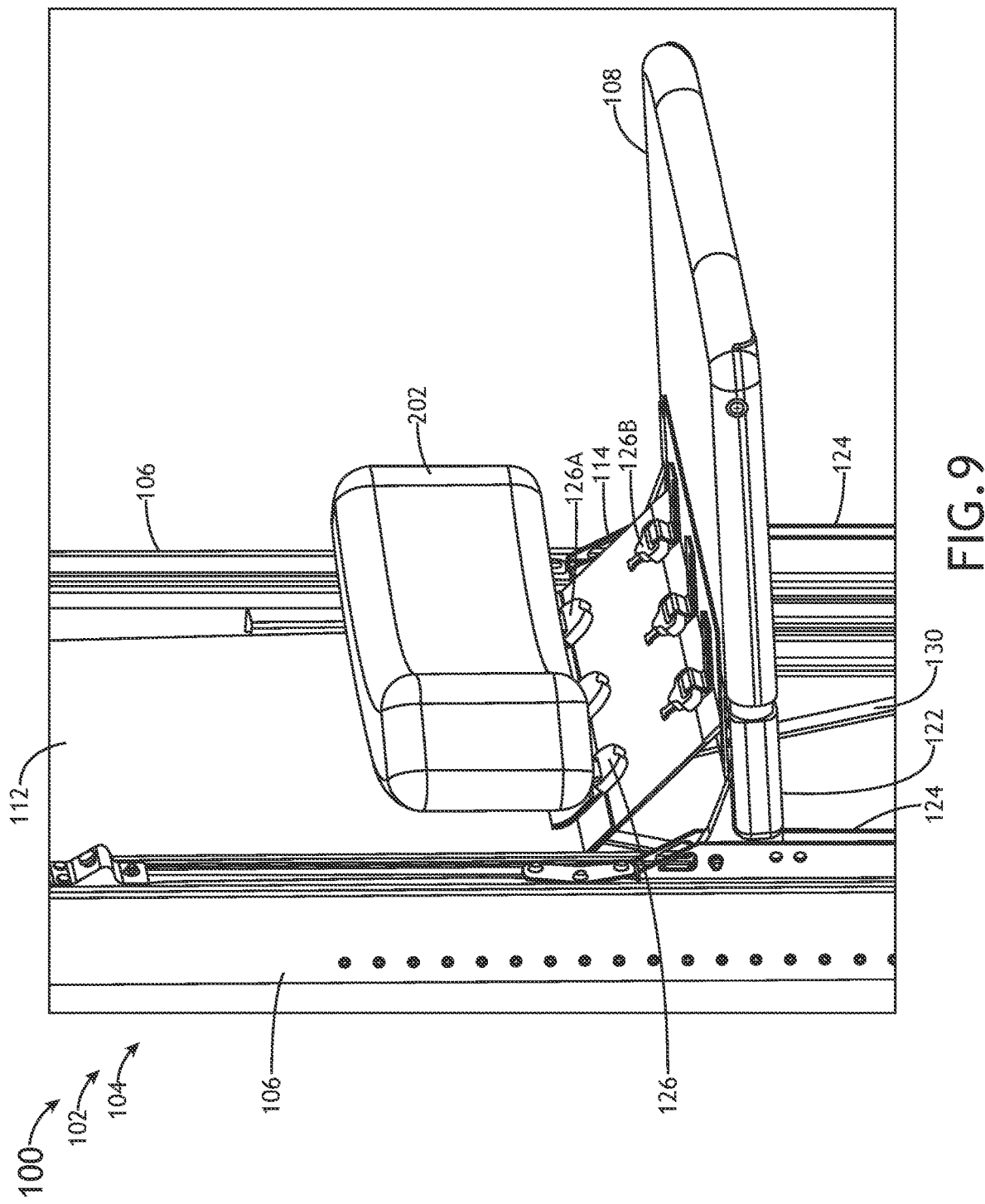
FIG. 9 is a view of a portion of the seat assembly of FIG. 1 according to the inventive concepts disclosed herein.
Figure 10:
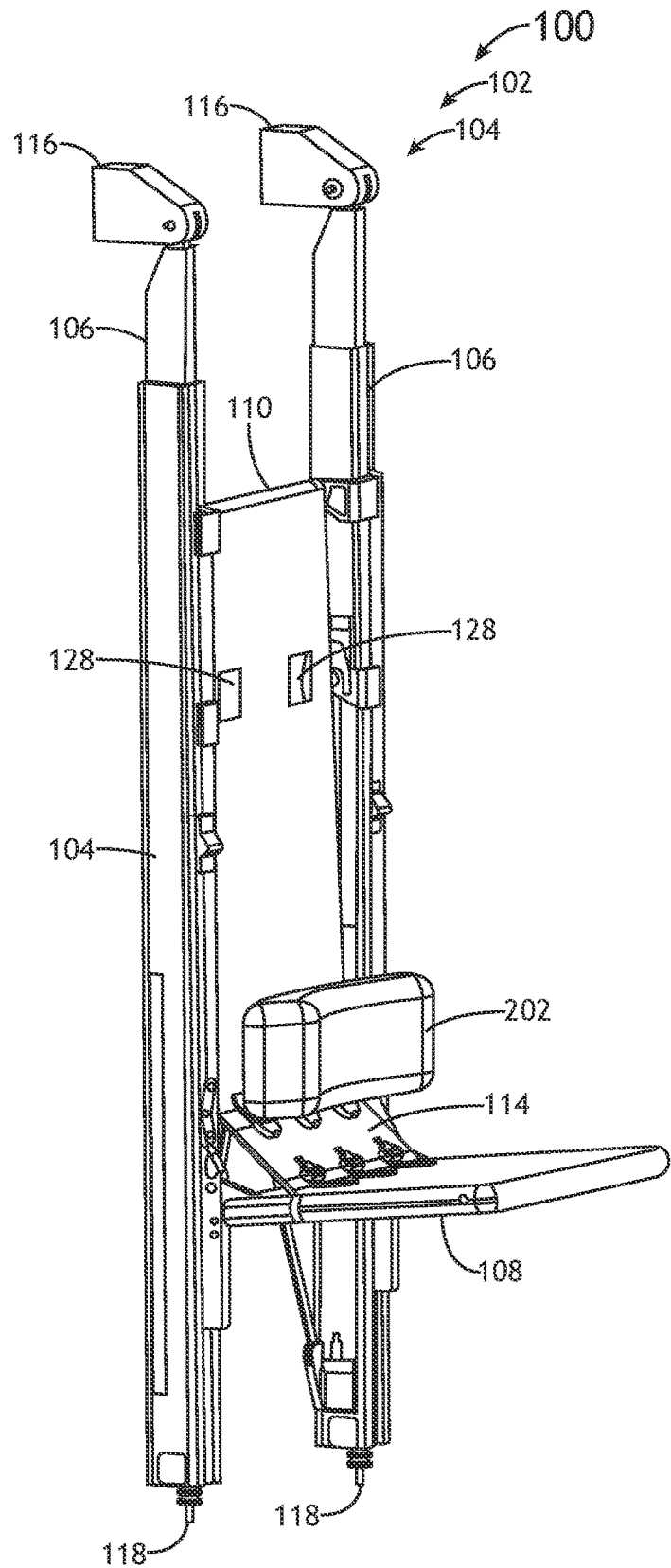
FIG. 10 is a view of the seat assembly of FIG. 1 according to the inventive concepts disclosed herein.
Figure 11:
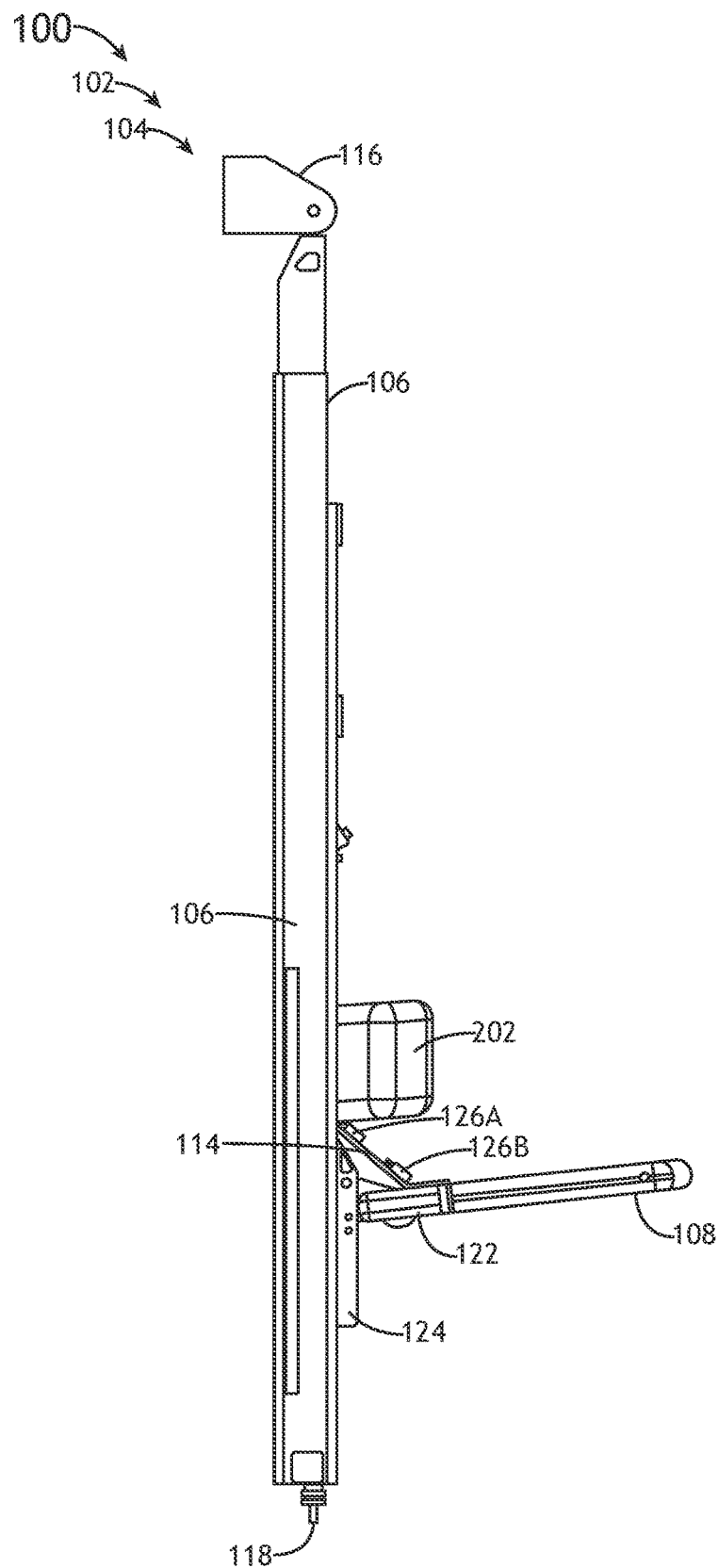
FIG. 11 is a view of the seat assembly of FIG. 1 according to the inventive concepts disclosed herein.
Figure 12:
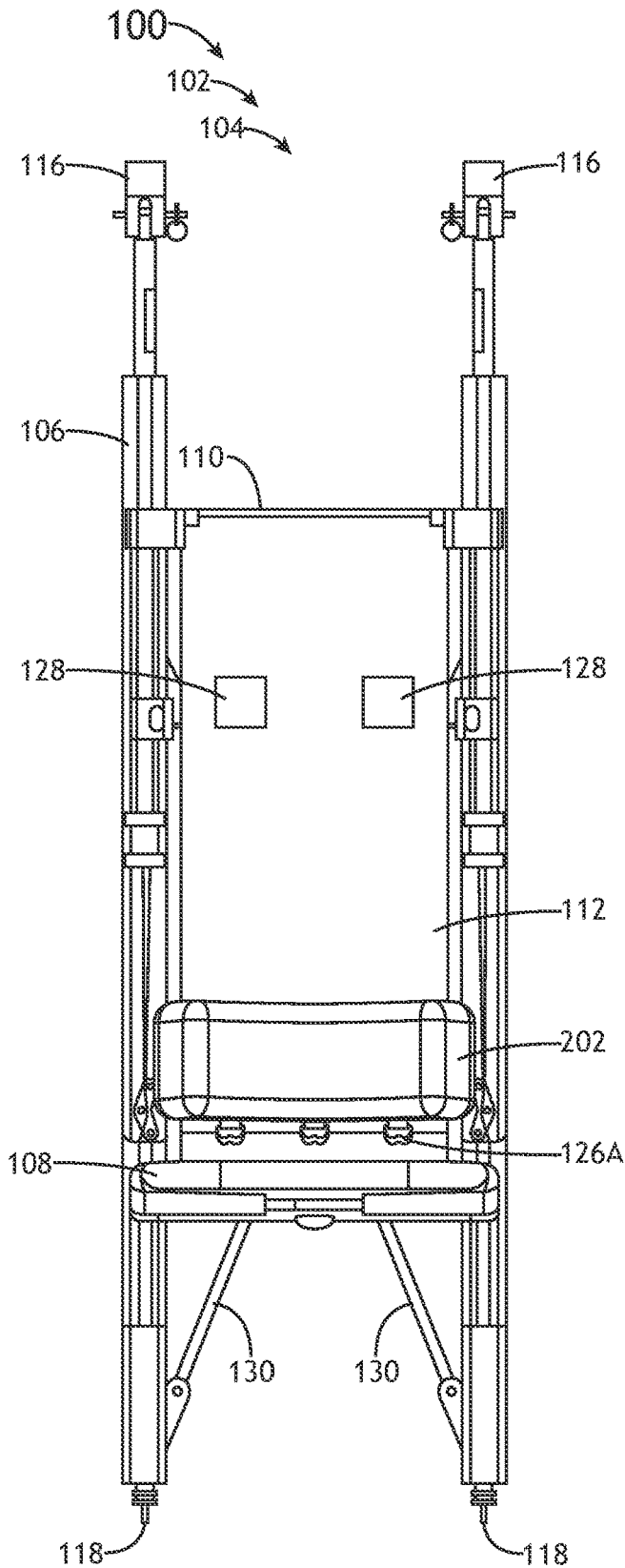
FIG. 12 is a view of the seat assembly of FIG. 1 according to the inventive concepts disclosed herein.

In some embodiments, such as shown in FIGS. 9 and 11, each of the at least one detachable attachment means 126 may comprise a first detachable attachment means portion 126A and a second detachable attachment means portion 126B. For example, each detachable attachment means 126 (e.g., three detachable means 126, as shown) may comprise a buckle having a female buckle portion (e.g., 126A) and a male buckle portion (e.g., 126B). In some embodiments, each of the detachable attachment means 126 may comprise any suitable detachable attachment means, such as a clip and ring, hook and ring, button, a snap, or the like. In some embodiments, each of the at least one detachable attachment means 126 may be composed at least of a metal material (e.g., aluminum, steel, or the like). In some embodiments, each of the at least one detachable attachment means 126 may be configured to support a tensile force of at least 5,000 Newtons (e.g., such as 9,000 Newtons or more).

Figure 13:
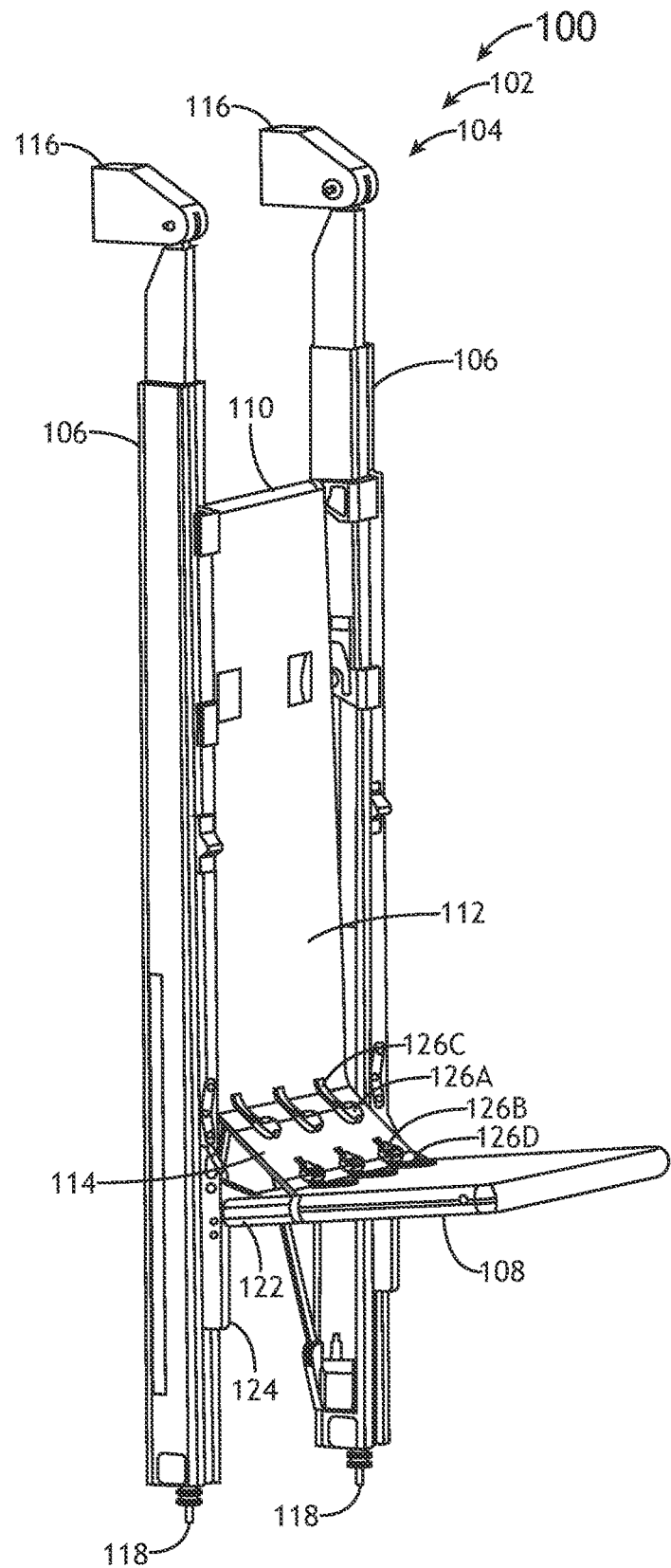
FIG. 13 is a view of the seat assembly of FIG. 1 according to the inventive concepts disclosed herein.
Figure 14:
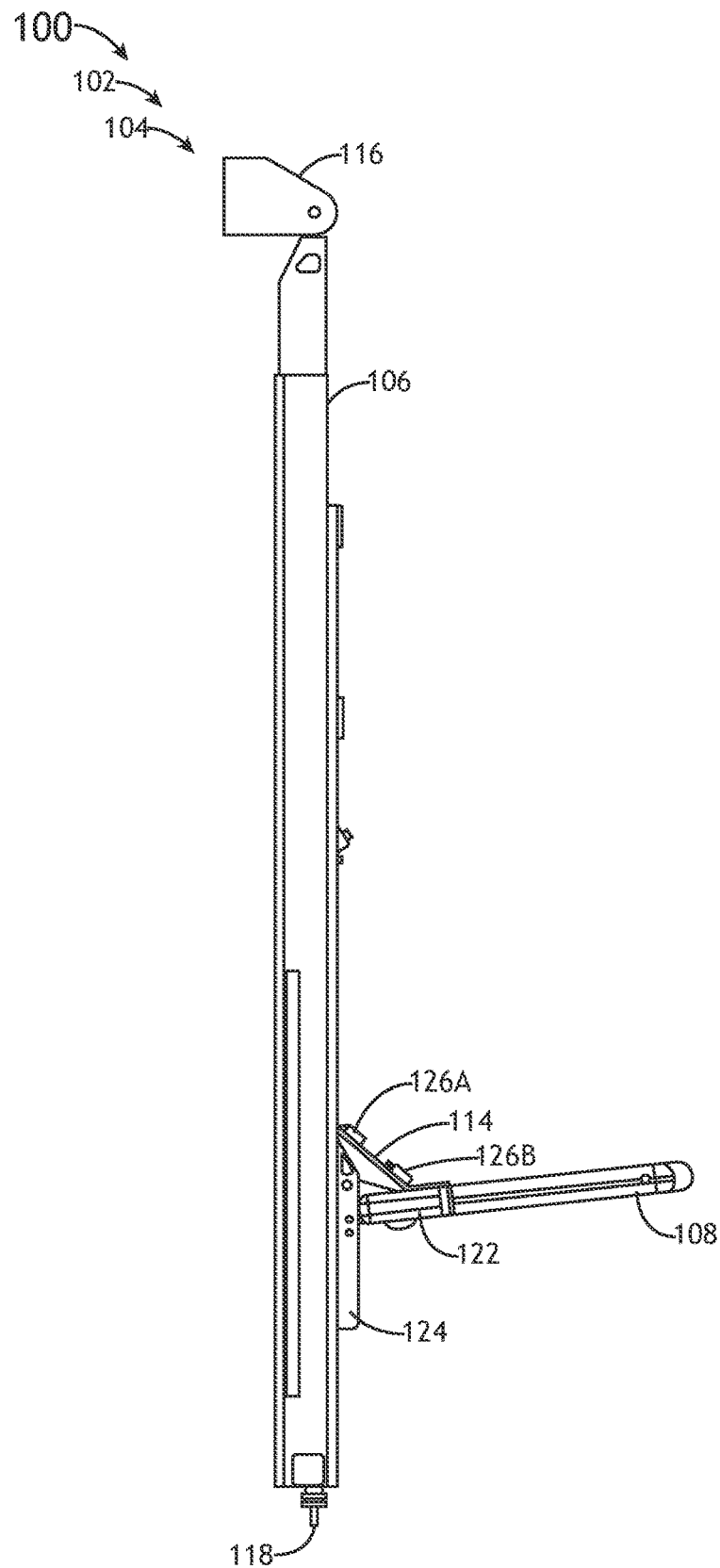
FIG. 14 is a view of the seat assembly of FIG. 1 according to the inventive concepts disclosed herein.

Referring now to FIGS. 13-15, an exemplary embodiment of the system 100 of FIGS. 1-12 is depicted according to the inventive concepts. FIGS. 13-15 show a portion of a seat assembly. As shown in FIGS. 13-15, all of the at least one detachable attachment means 126 may be in a detached state.

In some embodiments, such as shown in FIGS. 13 and 15, each of the at least one detachable attachment means 126 may comprise a first detachable attachment means portion 126A, a second detachable attachment means portion 126B, a first strap 126C, and a second strap 126D. For example, each detachable attachment means 126 may comprise a buckle having a female buckle portion (e.g., 126A), a male buckle portion (e.g., 126B), a first strap 126C coupled to the fabric seat back 112 and the first buckle portion (e.g., 126A), and a second strap 126D coupled to the fold-out seat pan 108 and/or the fabric seat back 112 and to the male buckle portion (e.g., 126B). In some embodiments, each of the detachable attachment means 126 may comprise any suitable detachable attachment means, such as a clip and ring, hook and ring, button, a snap, or the like.

Referring now to FIG. 16, an exemplary embodiment of the system 100 of FIGS. 1-15 is depicted according to the inventive concepts. FIG. 16 show a portion of the seat assembly. FIG. 16 shows a transition from all of the at least one detachable attachment means 126 being in an attached state to being in a detached state.

As shown in FIG. 16, when all of the detachable attachment means 126 are in the detached state, the fabric seat back 112 may be configured to move toward a position denoted by positions 112A (e.g., indicative of a position of the fabric seat back 112) and 114A (e.g., indicative of a position of the expandable seat back section 114 of the fabric seat back 112). For example, the fabric seat back 112 may move at least in part toward the first seat support beam 106 and toward the second seat support beam 106 when all of the detachable attachment means 126 are in the detached state. For example, when all of the detachable attachment means 126 are released, an occupant 200 and their pack 202 may push back against the fabric seat back 112 to allow the expandable seat back section 114 to fully extend along the occupant 200 and the pack 202 interface to fully support and carry loading.

As will be appreciated from the above, embodiments of the inventive concepts disclosed herein may be directed to a system including a seat assembly.

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:
1. A system, comprising:
   a vehicular seat assembly, comprising:
      a first seat support beam;
      a second seat support beam;

a fold-out seat pan configured to fold out to a seat pan deployed state, the fold-out seat pan rotatably coupled to first seat support beam and the second seat support beam;

a bar positioned between the first seat support beam and the second seat support beam;

a fabric seat back having a first end and a second end, the fabric seat back secured at the first end to the bar, the fabric seat back extending from the first end toward the second end, the fabric seat back having an expandable seat back section, the expandable seat back section secured at the second end to the fold-out seat pan; and at least one detachable attachment means, each of the at least one detachable attachment means secured at a first detachable attachment means end to the fold-out seat pan, each of the at least one detachable attachment means secured at a second detachable attachment means end to a portion of the fabric seat back located between the first end and the second detachable attachment means end;

wherein the expandable seat back section extends from the second end at least to the second detachable attachment means end;

wherein each of the at least one detachable attachment means is configured to be in an attached state or a detached state, wherein when all of the detachable attachment means are in the detached state an effective length of the fabric seat back extends to include the expandable seat back section.

2. The system of claim 1, wherein the expandable seat back section has a length of five to ten inches.

3. The system of claim 1, wherein when all of the detachable attachment means are in the detached state, the fabric seat back is configured to move at least in part toward the first seat support beam and toward the second seat support beam.

4. The system of claim 3, further comprising a pack positioned against the fabric seat back.

5. The system of claim 1, wherein the expandable seat back section extends from the second end past the second detachable attachment means end.

6. The system of claim 1, wherein each of the at least one detachable attachment means comprises a buckle.

7. The system of claim 6, wherein each buckle is composed at least in part of a metal material.

8. The system of claim 7, wherein the metal material comprises aluminum.

9. The system of claim 1, wherein the at least one detachable attachment means comprises three detachable attachment means.

10. The system of claim 9, wherein each of the three detachable attachment means is configured to support a tensile force of at least 5,000 Newtons.

11. The system of claim 1, wherein the fabric seat back is composed at least of nylon.

12. The system of claim 1, wherein the fold-out seat pan is composed at least of nylon.

13. The system of claim 1, wherein the second seat support beam is parallel to the first seat support beam, wherein the first seat support beam is a first vertical seat support beam, wherein the second seat support beam is a second vertical seat support beam.

14. The system of claim 13, wherein the bar is coupled to the first vertical seat support beam and to the second vertical seat support beam.

15. The system of claim 14, wherein the bar is a horizontal bar.

16. The system of claim 1, wherein the vehicular seat assembly is an aircraft seat assembly.

17. The system of claim 16, wherein the aircraft seat assembly is a rotorcraft seat assembly.

18. The system of claim 16, further comprising an aircraft, wherein the aircraft seat assembly is installed within the aircraft.

19. The system of claim 18, wherein the aircraft is a rotorcraft.

* * * * *